United States Patent [19] [11] 4,055,499
Laxo [45] Oct. 25, 1977

[54] FLUID SEPARATOR

[76] Inventor: Darryl E. Laxo, 10 Zanco Way, Novato, Calif. 94947

[21] Appl. No.: 719,551

[22] Filed: Sept. 1, 1976

[51] Int. Cl.² ............................................. B01D 21/26
[52] U.S. Cl. ............................. 210/119; 210/242 S; 210/304; 210/512 R; 210/533
[58] Field of Search ................. 210/83, 84, 78, 121, 210/512, 515, 523, 532, 533, DIG. 25, 119, 242 S, 304; 55/228

[56] References Cited
U.S. PATENT DOCUMENTS

| | | | |
|---|---|---|---|
| 1,948,543 | 2/1934 | Samiran | 210/115 |
| 2,115,043 | 4/1938 | Samiran | 210/533 |
| 2,180,811 | 11/1939 | King | 210/533 X |
| 2,330,508 | 9/1943 | McColl | 210/834 X |
| 3,439,810 | 4/1969 | Newman et al. | 210/512 R |
| 3,499,531 | 3/1970 | Feasel | 210/121 |
| 3,578,171 | 5/1971 | Usher | 210/DIG. 25 |
| 3,675,771 | 7/1972 | McKee | 210/242 |
| 3,709,366 | 1/1973 | Pruitt | 210/DIG. 25 |
| 3,852,193 | 12/1974 | Jakubek | 210/DIG. 25 |
| 3,909,416 | 9/1975 | MacVeld | 210/242 S |
| 3,919,081 | 11/1975 | Mail | 210/83 |
| 3,971,719 | 7/1976 | Peters | 210/121 |
| 3,977,975 | 8/1976 | Geultsen | 210/83 |

Primary Examiner—Theodore A. Granger
Attorney, Agent, or Firm—R. S. Sciascia; Charles D. B. Curry; James M. Skorich

[57] ABSTRACT

A system for separating fluids from each other. The mixture of fluids to be separated is injected into a cylindrical tank so as to cause the fluids to rotate and thereby accelerate their separation into strata. A float valve at the top of the tank allows lighter fluids to be exhausted while a second float valve at the bottom of the tank provides for the exhaust of heavier fluids. In the event of an oil spill on an open body of water, the present invention would provide for the clean up of the oil slick by separating it from the water.

4 Claims, 7 Drawing Figures

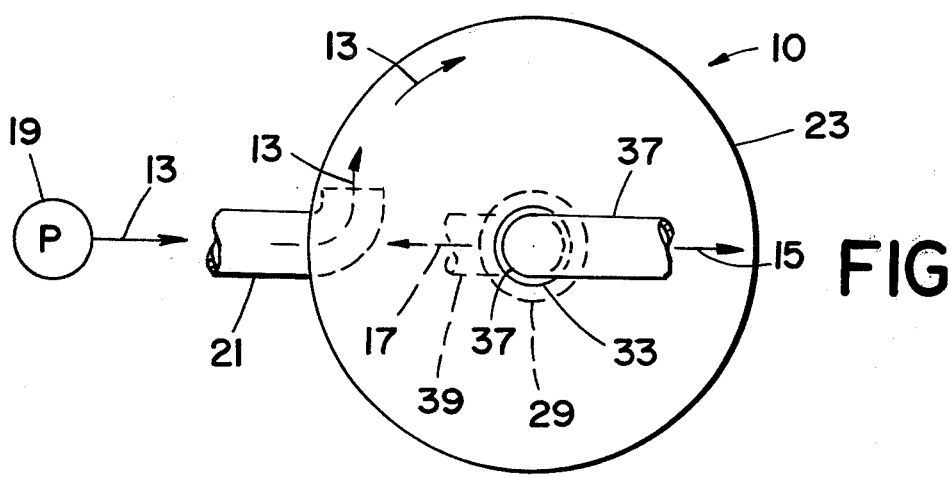
FIG _ 1
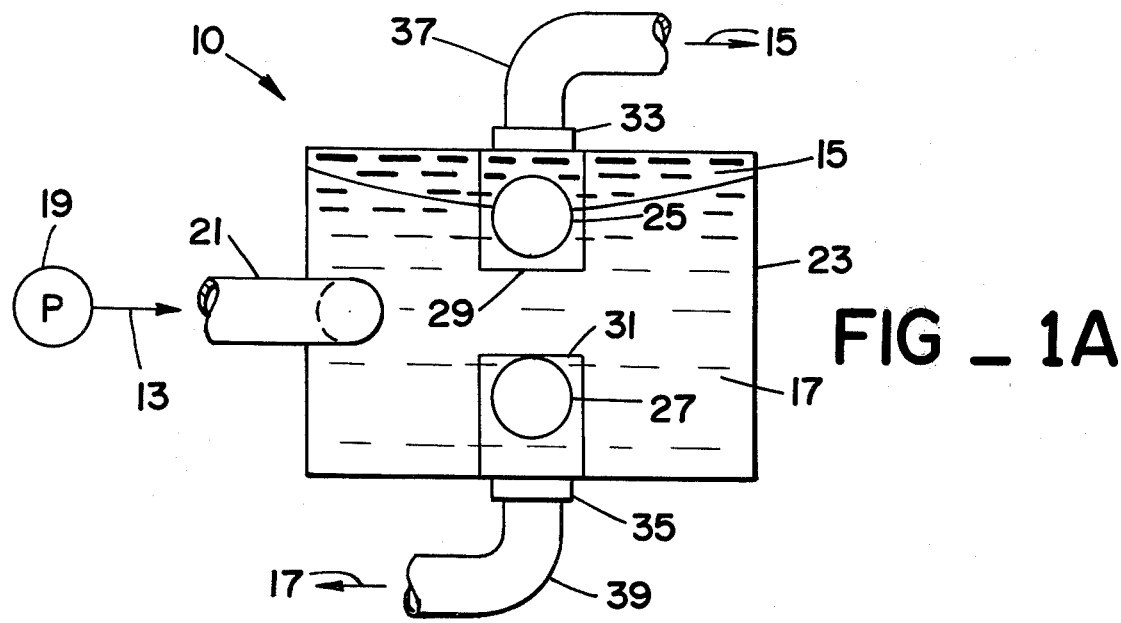
FIG _ 1A
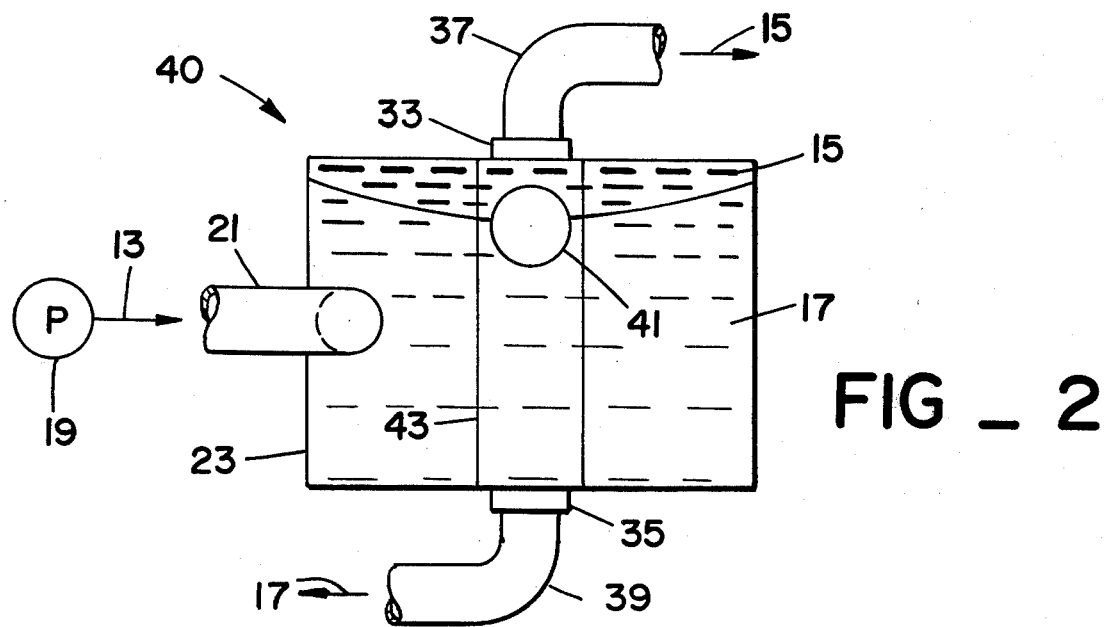
FIG _ 2

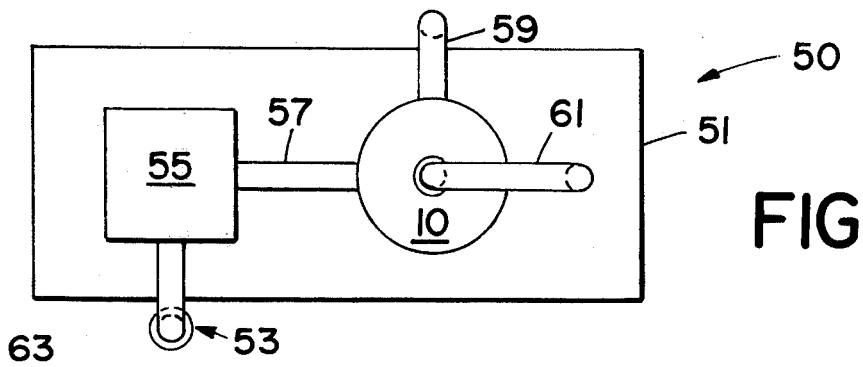
FIG_3
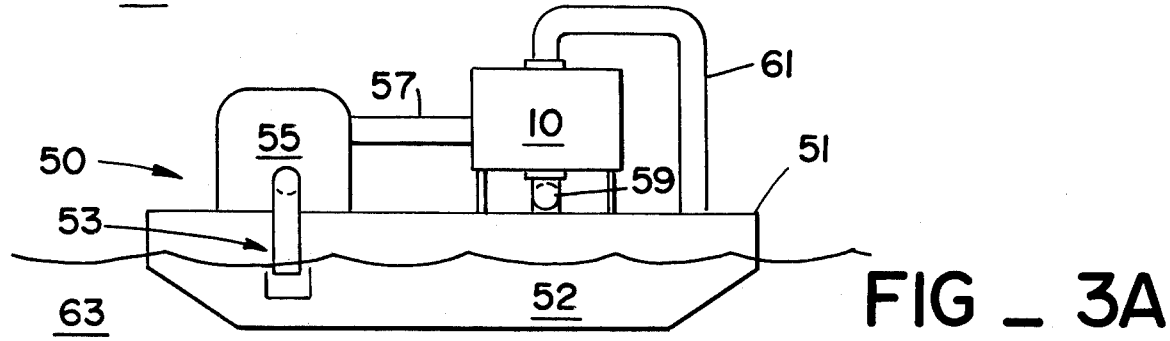
FIG_3A
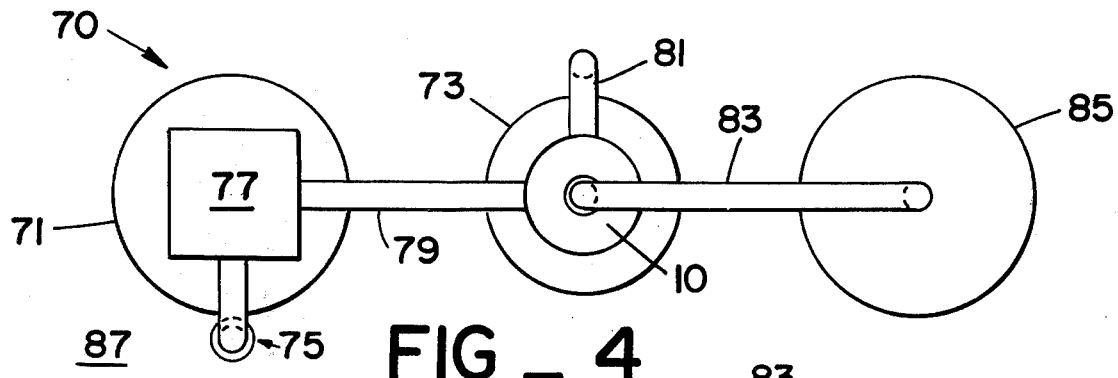
FIG_4
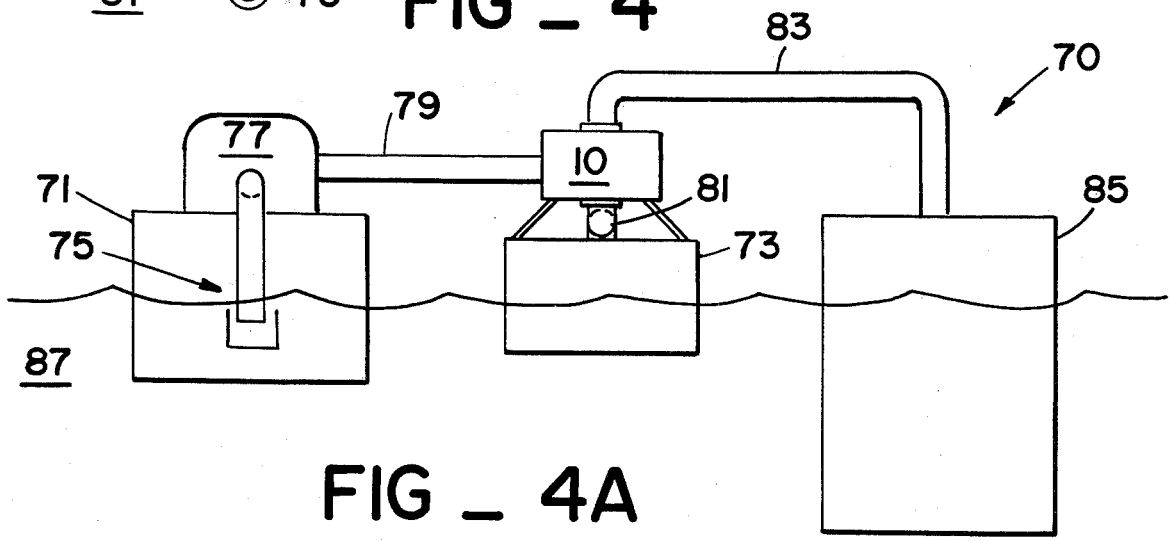
FIG_4A

FLUID SEPARATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a system for separating mixed fluids and, more particularly, for separating oil from a mixture of water and oil.

2. Description of the Prior Art

The basic problem to which the present invention is directed is that of separating or extracting one fluid from a mixture of a plurality of fluids. A more specific problem also addressed is that of removing petroleum products deposited upon an open body of water, i.e., separating out petroleum products from water.

Petroleum products may be deposited on an open body of water as the result of leakage from an underwater oil well or from the rinsing of a vessel's fuel tanks. Regardless of the cause or the particular composition of the petroleum product, the deposited petroleum product is extremely harmful to the environment and the potential damage increases the longer the spill is allowed to remain on the open water because of the likelihood that the spilled substance will travel and spread to increase the area of contaminated beaches and wildlife areas.

Presently, such spills are cleaned up by soaking up the petroleum product with an absorbent material such as straw or manually removing it from contaminated beaches and land where it has washed ashore. The first method is slow, inefficient, and expensive. The second method is also time consuming and expensive, does nothing to prevent the offshore portion of the spill from contaminating other beaches, and cannot undo the catastrophic effect that mere contact with petroleum products has upon fowl and other wildlife habitating or feeding in shore areas.

The present invention provides for the rapid separation of a fluid from a mixture of fluids and thus, when applied to the problem of cleaning up an oil spill, reduces the potential for environmental damage by providing for the fast and efficient separation and removal of petroleum products from an open body of water.

SUMMARY OF THE INVENTION

The present invention provides for the separation of a fluid from a mixture of fluids. Such is accomplished by causing the mixture to rotate within a cylindrical container to accelerate the stratification of the contained fluids and exhausting the stratified layers through float operated valves. The internal pressure of the container is maintained at a value greater than ambient in order to effectuate fluid exhaust whenever the valves are open. The invention provides for the clean up of oil spills by separating petroleum products from a mixture comprised of such products and water.

STATEMENT OF THE OBJECTS OF THE INVENTION

An object of the present invention is to rapidly and efficiently separate specific fluids from a mixed plurality of fluids.

Another object of the present invention is to rapidly and reliably separate petroleum products from a mixture comprised of petroleum products and water.

Yet another object of the present invention is to provide for the rapid and effective clean up of petroleum products deposited on an open body of water.

Still another object of the present invention is to provide an apparatus for cleaning up oil deposited on the surface of an open body of water which is capable of being quickly transported to the site of such a deposit.

Other objects, advantages and novel features of the invention will become apparent from the following detailed description of the invention when considered in conjunction with the accompanying drawings wherein:

BRIEF DESCRIPTION OF THE DRAWINGS

FIGS. 1 and 1A are top and side views, respectively, of a fluid separator of the present invention in which each of the two exhaust valves used is operated by a separate, independent caged float. FIG. 1A is a diagrammatic cross section.

FIG. 2 is a diagrammatic cross-sectional side view of a fluid separator of the present invention in which the two exhaust valves used are controlled by a common caged float.

FIGS. 3 and 3A are top and side views, respectively, of a barge mounted fluid separator of the present invention particularly suited for cleaning up petroleum products deposited on an open body of water.

FIGS. 4 and 4A are top and side views, respectively, of a multiple float mounted fluid separator of the present invention particularly suited for cleaning up petroleum products deposited on an open body of water.

DESCRIPTION OF THE PREFERRED EMBODIMENTS

FIGS. 1 and 1A illustrate the top and side views, respectively, of fluid separator 10, a preferred embodiment of the present invention. Fluid 13 is a fluid comprised of a mixed plurality of fluids whose components it is desired to separate; for the purposes of this description it is assumed that fluid 13 is comprised of oil 15 and water 17.

Fluid 13 is drawn by pump 19 from a source (not shown) through input pipe 21 and injected into container 23. Input pipe 21 is curved upon entering container 23 to cause fluid 13 to continuously rotate in a clockwise direction in order to accelerate the stratification of fluid 13 into layers according to the relative densities of the component fluids, i.e., oil 15 and water 17.

Spherical floats 25 and 27 are of a displacement and weight such that they float at the surface of water 17 yet sink in oil 15. When floats 25 and 27 are seated in float seats 33 and 35, respectively, exhaust pipes 37 and 39 are sealed shut. Cages 29 and 31 prevent floats 25 and 27, respectively, from moving laterally with respect to float seats 33 and 35, respectively.

The internal pressure of container 23 is maintained at a level higher than the respective pressures in pipes 37 and 39 by the continual pumping of fluid 13 into container 23. As a result, whenever the level of water 17 drops low enough to permit float 25 to become unseated (as shown in FIG. 1A), the aforementioned pressure differential will force oil 15 to exhaust out of container 23 through pipe 37. This outflow will continue until the level of water 17 rises sufficiently to cause float 25 to become seated in seat 33 and seal pipe 37.

Water 17 is exhausted through pipe 39 when (as shown in FIG. 1A) the level of water 17 is sufficiently high enough to unseat float 27 from seat 35.

FIG. 2 is a diagrammatic cross-sectional side view of fluid separator 40, another preferred embodiment of the present invention. The component elements and their operative interrelationships are as previously designated and discussed with respect to fluid separator 10 with the exception of the valving mechanism for exhaust pipes 37 and 39. As shown, fluid separator 40 employs only one float and cage, i.e., float 41 and cage 43.

Float 41 is of a displacement and weight which allow it to float at the surface of water 17 yet sink in oil 15. This construction enables float 41 to remain positioned on the interface between the strata comprised of oil 15 and water 17. Thus, as shown in FIG. 2, when the water level is high enough to prevent float 41 from being seated in float seat 35, yet too low for it to be seated in float seat 33, oil 15 will be exhausted through pipe 37 and, simultaneously, water 17 will be exhausted through pipe 39.

FIGS. 3 and 3A illustrate the top and side views, respectively, of barge mounted fluid separator 50, a preferred embodiment of the present invention for cleaning up an oil spill on an open body of water. In operation, barge mounted fluid separator 50 is situated in an area on an open body of water covered by an oil spill. It cleans up deposited oil by gathering up fluid mixture 63 comprised of deposited oil and water, separating the two, and then storing the oil and discharging the water into the open body of water.

Pump 55 and fluid separator 10 are mounted on the deck of barge 51. Skimmer 53 communicates between mixture 63 and pump 55 and input pipe 57 communicates between pump 55 and fluid separator 10. Fluid mixture 63 is drawn by pump 55 from the mouth of skimmer 53 located just below the surface of the open body of water, forced through pipe 57 and injected into fluid separator 10. In the manner hereinbefore discussed in detail (and illustrated in FIGS. 1 and 1A) fluid separator 10 separates the components comprising fluid mixture 63, i.e., oil and water.

Hold 52 of barge 51 serves as a reservoir for the oil separated out of fluid mixture 63. Pipe 61 communicates between the top of separator 10 and hold 52 to channel the separated oil into hold 52. Water discharge pipe 59 communicates between the bottom of separator 10 and the open body of water. It functions to return the separated water to the open body of water.

FIGS. 4 and 4A illustrate the top and side views, respectively, of multiple float mounted fluid separator 70, another preferred embodiment of the present invention to provide for the cleaning up of an oil spill from an open body of water.

Pump 77 is fixedly mounted atop floating platform 71, separator 10 is rigidly mounted atop floating platform 73, and tank 85 is sufficiently buoyant to float upright as shown even when it is full of separated oil.

Skimmer 75 communicates between pump 77 and fluid 87, a mixture comprised of oil and water. Hose 79 communicates between pump 77 and separator 10. Pump 77 draws fluid 87 through skimmer 75 and forces it through hose 79 and into separator 10.

Water discharge pipe 81 communicates between fluid separator 10 and the open body of water. Oil hose 83 communicates between fluid separator 10 and oil collection tank 85. Water separated out of mixture 87 through the operation of separator 10 (as hereinbefore discussed in detail) is discharged into the open body of water through pipe 81. Separated oil flows through hose 83 and into oil collection tank 85 for subsequent disposal.

With respect to both fluid separators 50 and 70, fluid separator 40 (shown in FIG. 2) may be substituted for fluid separator 10 (shown in FIGS. 1 and 1A).

In summary, mounted fluid separators 50 and 70 provide mobile apparatus for rapidly cleaning up oil spills. The main difference between them is that separator 50 is an integral unit which must be towed to the area covered by the oil spill or propelled by a self-contained propulsion apparatus. By contrast, separator 70 is comprised of components which may be disassembled and conveniently stored aboard a ship or on land when not in use. Storage space may be saved by using self-inflatable (as opposed to rigid construction) floats.

As separator 70 may be transported in disassembled form to the site of the oil spill, the apparatus may be carried aboard a vessel then assembled and dropped over the side or connected aboard an airplane and dropped by parachute. The latter provides an especially rapid method of commencing clean up operations before the oil slick has had time to spread or travel as well as under conditions when clean up operations would otherwise have to be delayed due to rough seas, and thus provides manifest advantages over the clean up methods presently in use.

What is claimed is:

1. A fluid separator comprising:
   a. a closed container;
   b. means for injecting a mixture of fluids having differing densities into said container so that said mixture is stratified;
   c. a top outlet valve at the top of said container to connect the interior of said container to a first exhaust pipe;
   d. a bottom outlet valve at the bottom of said container to connect the interior of said container to a second exhaust pipe;
   e. a plurality of ball floats, one for each of said outlet valves, ballasted to sink in the less dense fluid and to float in the more dense fluid; and
   f. a plurality of cages, one attached interiorly of said container to each of said outlet valves, each containing one of said ball floats, to keep said ball floats aligned with their respective valves such that the less dense fluid of said mixture is exhausted through said top outlet valve and the more dense fluid of said mixture is simultaneously exhausted through said bottom outlet valve depending upon the level of the interface between the fluids.

2. A fluid separator as recited in claim 1 further comprising means for imparting rotation to said mixture to enhance stratification of the fluids of said mixture by centrifugal force.

3. A fluid separator as recited in claim 2 wherein said imparting means comprises means for directing the input flow of said mixture from said injecting means tangentially to the inner surface of the walls of said container at a point midway between the top and bottom of said container.

4. A fluid separator as recited in claim 3 further comprising:
   a. a plurality of portable buoyant platforms;
   b. means for skimming the surface of a fluid mixture, said skimming means connected to the input of said injecting means to provide a source for said mixture to said container, said injecting means being mounted on one of said portable buoyant platforms;
   c. a portable buoyant reservoir connected to said first exhaust pipe from said container, said container being mounted on a second one of said portable buoyant platforms.

* * * * *